United States Patent [19]

Sieber et al.

[11] Patent Number: 4,807,258
[45] Date of Patent: Feb. 21, 1989

[54] METHOD FOR SYNCHRONIZING A DIGITAL COMMUNICATION SYSTEM

[75] Inventors: Richard W. Sieber, Attleboro; David A. Perreault, Reading; Arnold Paige, Natick, all of Mass.

[73] Assignee: GTE Laboratories Incorporated, Waltham, Mass.

[21] Appl. No.: 121,654

[22] Filed: Nov. 17, 1987

[51] Int. Cl.⁴ .............................................. H04L 7/00
[52] U.S. Cl. .................... 375/108; 375/109; 371/47
[58] Field of Search ............... 375/106, 36, 108, 109; 370/103; 371/42, 47, 33

[56] References Cited

U.S. PATENT DOCUMENTS

| | | | |
|---|---|---|---|
| 3,813,496 | 5/1974 | Maillet | 375/109 |
| 3,866,172 | 2/1975 | Caron | 375/109 |
| 4,225,960 | 9/1980 | Masters | 375/109 |
| 4,630,284 | 12/1986 | Cooperman | 375/36 |
| 4,638,473 | 1/1987 | Cooperman et al. | 370/27 |
| 4,691,294 | 9/1987 | Humpleman | 370/103 |
| 4,727,370 | 2/1988 | Shih | 375/109 |

OTHER PUBLICATIONS

"Experimental Single-Chip PABX," *IEEE Journal of Solid State Circuits*, vol. SC-21, No. 2, Apr. 1986, pp. 247-251.

*Primary Examiner*—Robert L. Griffin
*Assistant Examiner*—Stephen Chin
*Attorney, Agent, or Firm*—Wolf, Greenfield & Sacks

[57] ABSTRACT

In a digital communication system including a central PABX subsystem coupled by a transmission line to a remote telephone subsystem, a method for establishing synchronization between the PABX and the telephone. The data format includes a message transmitted from the PABX to the telephone during the first half of a frame and a response transmitted from the telephone to the PABX during the second half of the frame. The synchronization method includes the steps of recognizing that synchronization has been lost, discontinuing transmission of responses by placing the line driver in a high impedance state while continuing transmission of messages, and detecting a valid message on the transmission line. The valid message is detected by finding in sequence, a message stop bit, the stop bit remaining on the line for one half frame and a message start bit. When a valid message is detected, transmission of responses is resumed.

8 Claims, 3 Drawing Sheets

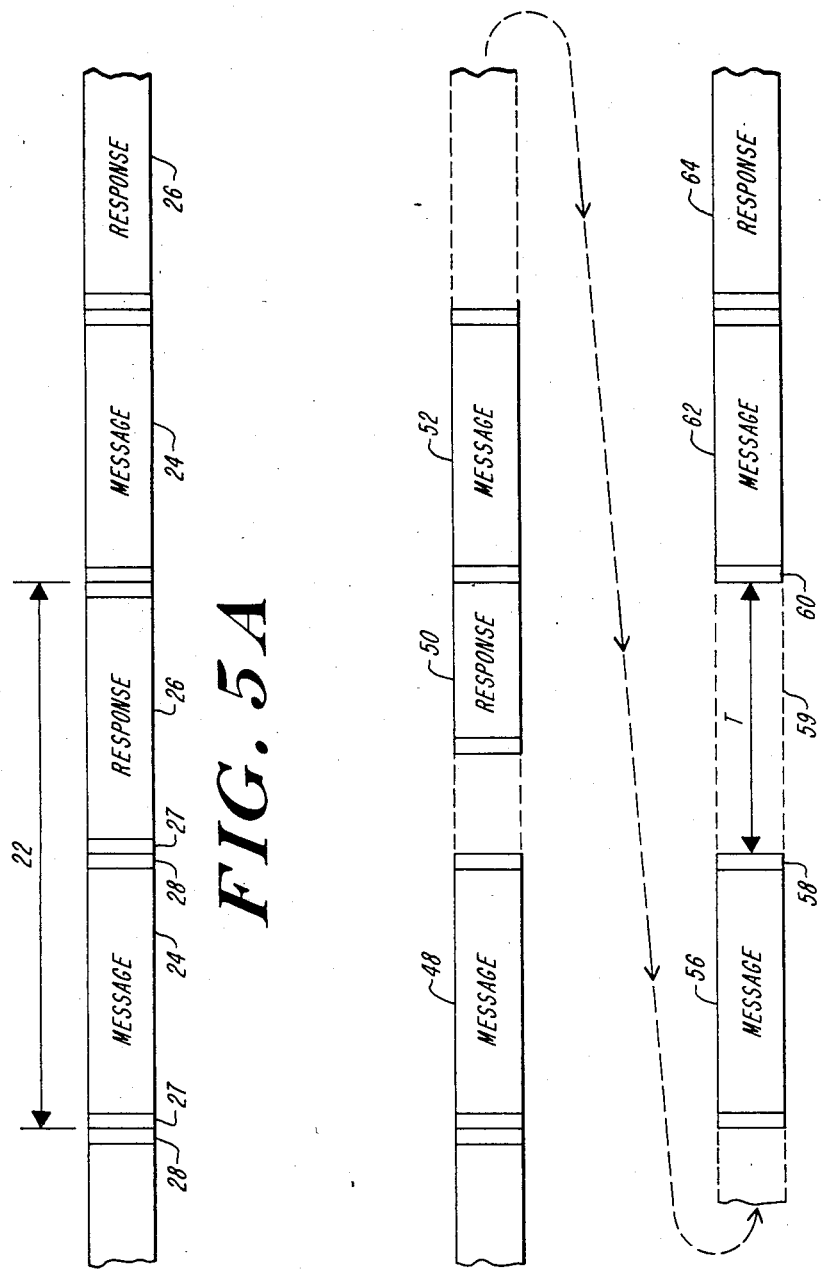

METHOD FOR SYNCHRONIZING A DIGITAL COMMUNICATION SYSTEM

FIELD OF THE INVENTION

This invention relates to telecommunication and data communication systems and, more particularly, to a method for synchronizing digital communication systems which utilize a repetitive frame including a message portion and a response portion.

BACKGROUND OF THE INVENTION

Present day electronic private automatic branch exchanges (PABX's) are bulky, costly and consume considerable power. These shortcomings can be reduced dramatically by implementing the PABX in the latest VLSI technology. Recently, a single chip PABX which can provide voice and data service to 40 subscribers and that can be interconnected to form a larger PABX system has been developed. The single chip PABX is described by M. Cooperman et al in "Experimental Single Chip PABX", IEEE Journal of Solid State Circuits, Vol. SC-21, No. 2, April 1986, pp. 247-251 and in U.S. Pat. No. 4,630,284 assigned to the assignee of the present invention. A single chip PABX system utilizes digital communication for sending both voice and data between a central switch, the local single chip PABX, telephones and data terminals. The connection between each telephone and the local PABX utilizes twisted pair wiring operating in the time division duplex mode.

Although VLSI circuits can perform highly complex functions with extremely small geometry, they are very limited in power dissipation. Conventional digital line driving techniques employ terminations at the receiving end to prevent reflections. The line driver transistor geometry must be large, and the driver must deliver several hundred milliwatts to the termination load. In order to integrate the line driving and line receiving functions into the single chip PABX, transmission lines that are unterminated at the receiving end are utilized. As a result of the interaction between the transmitted and reflected waveforms, power is dissipated only during logic transitions. The power averages 10 milliwatts per line driver for a data rate of 310 kilobits per second and a maximum line length of 400 feet.

The single chip PABX system utilizes a communication protocol wherein a message is transmitted from the PABX chip to the telephone during the first portion of a frame and a response is transmitted from the telephone to the PABX chip during a second portion of the frame. Transmission distances are relatively short so that messages and responses can be detected during the prescribed time intervals. A response is transmitted at the end of a message and is received within one bit time by the PABX chip. Similarly, a message is transmitted following the end of the response and is received within one bit time by the telephone. As a result, the complexity and power requirements of asynchronous receivers are eliminated. Nonetheless, it is possible for the PABX chip and the telephone to lose synchronization, for example, due to noise on the transmission line. The loss of synchronization is not a serious problem if synchronization can be reestablished in a short time. It is desirable to provide a method for reestablishing synchronization without additional hardware or added complexity.

It is a general object of the present invention to provide improved methods for data communication.

It is another object of the present invention to provide methods for reestablishing synchronization between two subsystems connected by a data communication link when synchronization is lost.

It is yet another object of the present invention to provide a digital communication link capable of operation in the presence of electrical noise.

It is still another object of the present invention to provide a telecommunication system adapted for integration on one or a few integrated circuit chips.

SUMMARY OF THE INVENTION

The present invention relates to a digital transmission system wherein a first PABX subsystem transmits a message to a second telephone subsystem during a message portion of a repetitive frame and wherein the second subsystem transmits a response to the first subsystem during a response portion of the frame. According to the present invention, the above and other objects and advantages are achieved in a method for establishing synchronization between the first subsystem and the second subsystem. The method comprises the steps of (a) the second subsystem recognizing that synchronization between the message and the response has been lost; (b) when synchronization has been lost, discontinuing transmission of responses by the second subsystem while continuing transmission of messages by the first subsystem; (c) the second subsystem monitoring received messages until a valid message is detected; and (d) resuming transmission of responses having prescribed time relationships with respect to the valid message and subsequent messages.

In a preferred method in accordance with the present invention, the messages and the responses are sent on a transmission line having a low power line driver and a low power line receiver at each end. When the responses are discontinued, the low power line driver in the second subsystem is placed in a high impedance state. The step of monitoring received messages includes the steps of detecting a stop bit of a message, detecting a continuous string of bits equal to the stop bit of the message, the string of bits having a predetermined length, and detecting a start bit at the end of the string of bits of predetermined length. The start bit at the end of the string of bits indicates the start of a valid message.

BRIEF DESCRIPTION OF THE DRAWINGS

For a better understanding of the present invention together with other and further objects, advantages and capabilities thereof, reference is made to the accompanying drawings which are incorporate, therein by reference and in which:

FIGS. 5A and 5B are timing diagrams illustrating the synchronizing method of the present invention.

DETAILED DESCRIPTION OF THE INVENTION

Figure 1:
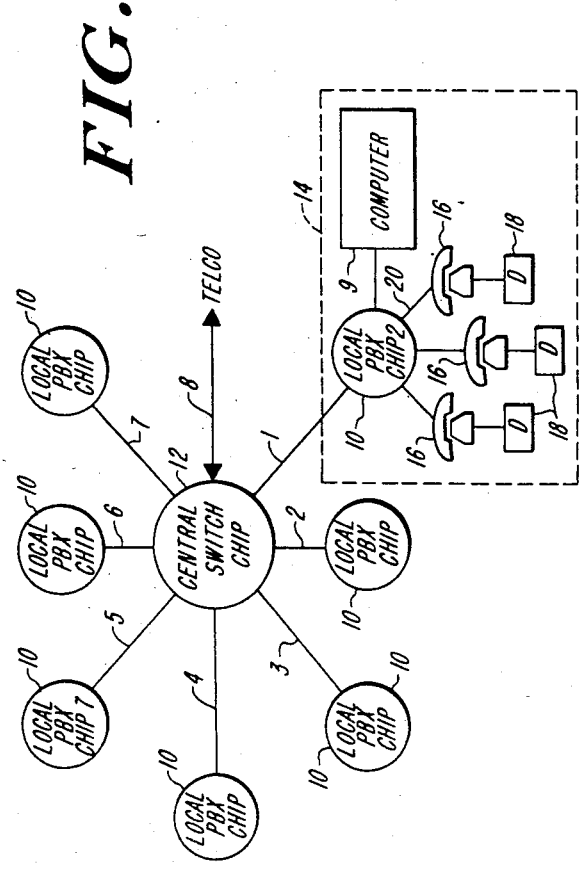
FIG. 1 is a schematic block diagram of a digital transmission system suitable for incorporation of the present invention.

A digital transmission system suitable for incorporation of the line delay compensation technique of the present invention is shown in FIG. 1. A central switch 12 communicates over serial transmission lines and performs such functions as storage and switching of signal information to different local PABX systems and to the telephone company equipment. Central switch 12 is interconnected with a plurality of local PABX systems 14, each of which includes a local PABX chip 10 and up to 40 telephone/data terminals 16 and 18, three of which are shown in FIG. 1. The communication links, or trunk lines 1–7, between the central switch 12 and the local PABX chips 10, and the trunk line 8 between the central switch chip 12 and the telephone company equipment, may be conventional two-wire transmission lines or, preferably, fiber optic communication links, which provide a substantially noise-free communication link with wide bandwidth.

Each local PABX chip 10 is a self-contained unit capable of providing multiplexing, storage and signal processing for up to 40 telephone/data terminals 16, 18. The voice signal from the microphone of telephone 16 is converted by conventional means to a standard pulse code modulated (PCM) bit stream of 64 kilobytes per second and is combined with data from data terminal 18 for transmission over a single twisted pair of wires 20 to the local PABX chip 10. Voice or data communication over trunk line 1 to the central switch 12 is TDM digital. All activated transmission lines 20 provide communication with the local PABX chips 10 using a repetitive frame data structure.

Figure 2:
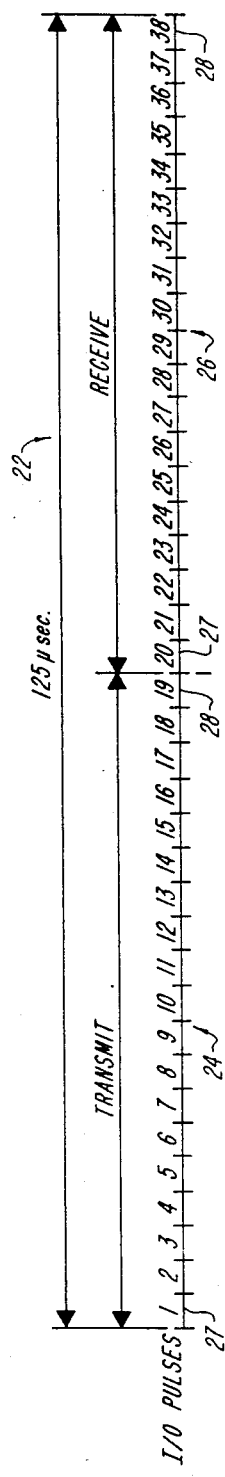
FIG. 2 is a timing diagram illustrating the data transmission format used in the local PABX system of FIG. 1.

As shown in FIG. 2, each frame 22 is 125 microseconds in duration, corresponding to the standard 8 KHz sampling frequency. The 125 microsecond frame includes a nineteen bit transmit portion, or message 24, followed by a nineteen bit receive portion, or response 26. The format for each one-way communication between the local PABX chip 10 and each telephone/data terminal 16, 18 consists of a start bit 27, eight voice bits, eight data bits, one signalling bit and one stop bit 28 for a total of nineteen bits. Information flows from the PABX chip 10 to the telephone/data terminals 16, 18 during the transmit portion, or message 24, of each frame and flows in the reverse direction during the receive portion, or response 26, of each frame.

Figure 3:
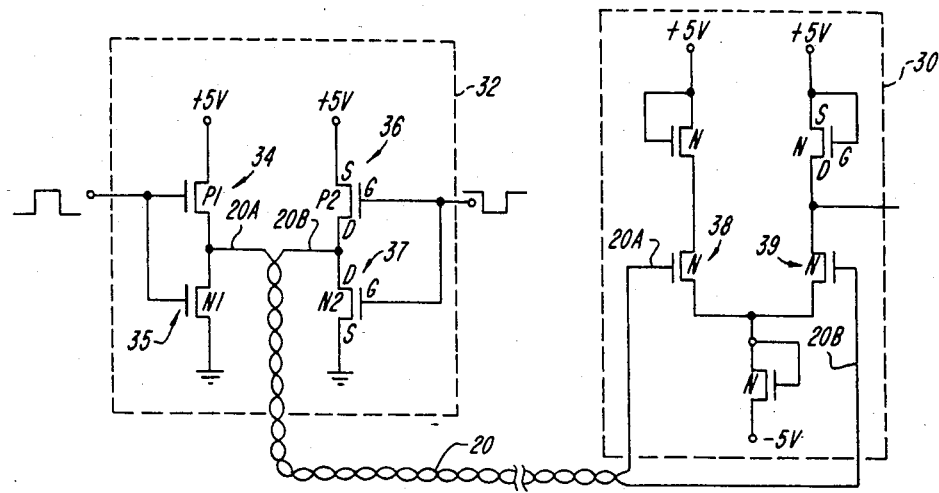
FIG. 3 is a schematic diagram illustrating a line driver and a line receiver suitable for use in the present invention.

A low power differential driver and differential receiver suitable for digital transmission in the system of FIG. 1 are illustrated in FIG. 3. A differential line receiver 30 is located at the receiving end, and a differential line driver 32 is located at the sending end. It is to be understood the two ends are interchangeable.

The differential line driver 32 consists of a first P/N MOS transistor pair 34, 35 and a second P/N MOS transistor pair 36, 37. The source terminals of transistors 34 and 36 are coupled to +5V, and the source terminals of transistors 35 and 37 are coupled to ground. Twisted wire transmission line 20 has one wire 20a coupled to the drain terminals of transistors 34 and 35 while the drain terminals of transistors 36 and 37 are coupled to the other wire 20b. The information bit stream is coupled to gate terminals of transistors 34 and 35 and the inverted bit stream is coupled to the gates of transistors 36 and 37, thereby differentially driving the transistor pairs and hence, the transmission line 20. The receiving end of the transmission line 20 is coupled to the gates of MOS transistors 38, 39 which present a high input impedance, thus effectively providing an open circuit at the receiving end.

The characteristic impedance $Z_o$ of transmission line 20 is typically 100 ohms. The transistor pair geometries are selected to provide a drain-source resistance of $\frac{1}{2}Z_o$, or 50 ohms. The line driver 32 has a source impedance of 100 ohms matched to the line impedance $Z_o$, and the transmission line 20 is thus terminated at the sending end. The digital transmission system shown in FIGS. 1–3 is described in more detail in U.S. Pat. No. 4,630,284 issued Dec. 16, 1986 which is hereby incorporated by reference.

Referring again to FIG. 2, the telephone 16 is normally synchronized to the PABX chip 10 by detecting the start bit 27 at the beginning of the message 24 and the stop bit 28 at the end of the message 24. The response 26 is then transmitted from the telephone 16 to the PABX chip 10 immediately after the message stop bit 28 or a predetermined time after the message stop bit 28. The PABX chip 10 is preprogrammed to receive the start bit of the response 26 at the predetermined time after the message stop bit. Occasionally, the telephone 16 loses synchronization with the PABX chip 10 due to a long burst of noise on the transmission line 20, temporary loss of power or inadvertent disconnection of the transmission line. When loss of synchronization occurs, telephone 16 does not correctly recognize the message stop bit 28 and begins transmitting the response 26 earlier or later than required. Thus, the response received by the PABX chip 10 is shifted in time and erroneous data is entered into the PABX chip 10.

The method of the present invention provides the capability to reestablish synchronization rapidly so that only a few frames are lost. When only a few frames of voice are lost, there is little perceived effect. When data is lost, the error control mechanism in the data link control protocol detects the loss and causes a retransmission.

In order to insure that when synchronization is lost it is reestablished as soon as possible, the telephone 16 monitors the data transmissions between the PABX chip 10 and the telephone 16 in order to determine when synchronization has been lost. There are several ways in which loss of synchronization can be recognized. For example, receiver 30 in the telephone 16 can detect the message stop bit 28 and when it does not occur at the proper time relative to the telephone timing circuitry, loss of synchronization can be declared. However, it is preferred to require that an improperly timed message stop bit 28 be present on several successive frames 22 before loss of synchronization is declared. This reduces the possibility for noise to be confused with a loss of synchronization. Alternatively, the message start bit 27 can be detected on one or several successive frames. In another method for detecting loss of synchronization, special bit sequences can be transmitted within the data in a predetermined manner, and if the telephone 16 does not find the sequence where expected, loss of synchronization is declared. In general, techniques for determining loss of synchronization are known in the art.

Figure 4:
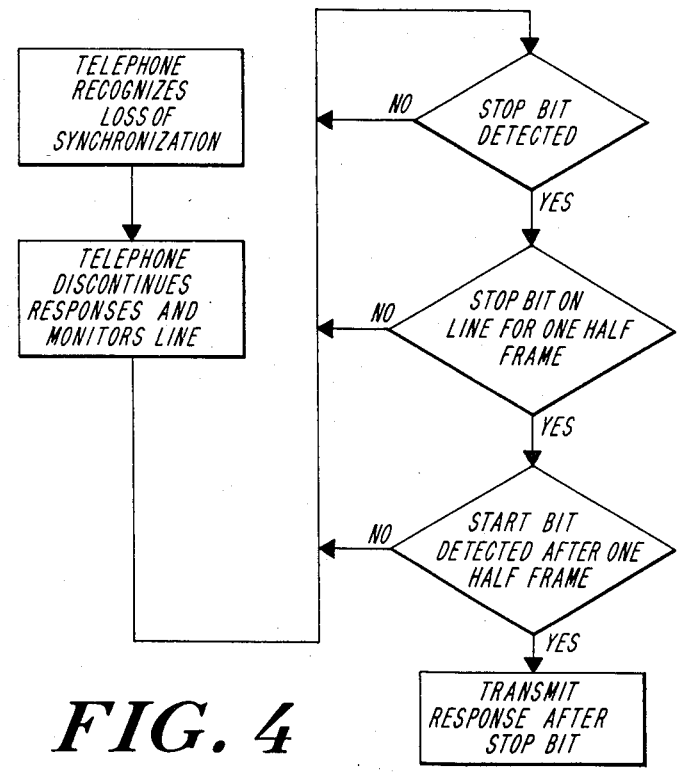
FIG. 4 is a flow diagram illustrating the synchronizing method of the present invention.

When loss of synchronization is recognized by the telephone 16, the transmission of responses 26 is discontinued and the line driver 32 is placed in a high impedance state. The telephone 16 now monitors transmission line 20 as shown in FIG. 4. The PABX chip 10 recognizes that no responses 26 are being received and enters a resynchronization mode in which it continues to transmit messages 24 once each frame 22 even though no responses 26 are received. Typically, the same message 24 is repeated until synchronization is reestablished.

The telephone 16 after discontinuing transmission of responses 26 and placing its line driver 32 in a high impedance state, monitors the transmission line 20 for transmissions from the PABX chip 10. The telephone 16 is programmed to look for the stop bit 28 of the message 24 which is repetitively transmitted by the PABX chip 10. After the stop bit 28 is sent, the transmission line 20 stays in the same state as the stop bit 28 until the start bit 27 of the next message 24. In the present example, the stop bit 28 remains on the transmission line 20 for the duration of the response 26 (which is not being transmitted), or 19 bits. At the end of this period, a start bit 27 of the next message 24 should be received. If the start bit 27 is received after the line 20 remains in the stop bit state for the prescribed time, then a valid message 24 is recognized. When the stop bit 28 does not stay on the line for the prescribed time or when the start bit 27 is not received at the end of the prescribed time, then monitoring for the stop bit 28 is restarted. When the start bit 27 of the valid message 24 is recognized, telephone 16 has been resynchronized with the PABX chip 10 and a response 26 is transmitted after the stop bit 28 of the valid message. It will be understood that the synchronization procedure can, if desired, require recognition of two or more valid messages 24 before resuming transmission in order to insure that synchronization is correctly reestablished.

Referring to FIG. 5A, there is shown the message 24 and response 26 sequence when the PABX chip 10 and telephone 16 are synchronized. It is noted that the start bit 27 of the response 26 occurs immediately after the stop bit 28 of the message 24, and the process is repetitive.

The resynchronization procedure in accordance with the present invention is illustrated in FIG. 5B. The telephone 16 loses synchronization with the PABX 10 after message 48, causing response 50 to be transmitted out of synchronization, or at the incorrect time. The loss of synchronization is detected as described hereinabove and after message 52, the telephone 16 stops transmitting responses and monitors the transmission line 20. Message 56 is transmitted, even though no response is transmitted. At the end of message 56, the telephone 16 detects the stop bit 58 and then detects the stop bit remaining on the transmission line for one-half frame, or 19 bits, (T=62.5 microseconds) since no data is being transmitted. At the end of one-half frame, the telephone detects start bit 60 of message 62. When stop bit 58, no data for one-half frame and start bit 60 are all detected in sequence, message 62 is recognized as a valid message. At the end of message 62, telephone 16 resumes transmission of responses and transmits a response 64. At this time, the PABX chip 10 and the telephone 16 have reestablished synchronization and continue to communicate as shown in FIG. 5A. If one or more of the three required items in the above sequence is not detected, the resynchronization procedure fails and must be restarted.

While there has been shown and described what is at present considered the preferred embodiments of the present invention, it will be obvious to those skilled in the art that various changes and modifications may be made therein without departing from the scope of the present invention as defined by the appended claims.

What is claimed is:

1. In a digital transmission system wherein a first subsystem transmits a message on a transmission line to a second subsystem during a message portion of a repetitive frame and the second subsystem transmits a response on the transmission line to the first subsystem during a response portion of the frame, a method for establishing synchronization between the first subsystem and the second subsystem comprising the steps of:
   (a) the second subsystems recognizing that synchronization between said message and said response has been lost;
   (b) when synchronization has been lost, discontinuing transmission of responses by the second subsystem while continuing transmission of messages by the first subsystem;
   (c) the second subsystem monitoring the transmission line until a first message followed by an absence of both message and response for a predetermined time, followed by a second message, are detected; and
   (d) resuming transmission of responses having prescribed time relationships with respect to said second message and each subsequent message.

2. A synchronization method as defined in claim 1 wherein a low power line driver and a low power line receiver are provided at each end of said transmission line.

3. A synchronization method as defined in claim 2 wherein the step of monitoring the transmission line includes the steps of
   detecting a stop bit of a message,
   detecting a continuous string of bits equal to the stop bit of said message, said string of bits having a predetermined length, and
   detecting a start bit at the end of said string of bits, said string of bits of predetermined length followed by said start bit indicating the start of said second message.

4. A syncrhonization method as defined in claim 3 wherein the predetermined length of said string of bits is equal to the duration of said message.

5. A synchronization method as defined in claim 2 wherein the step of discontinuing transmission includes placing the low power line driver in a high impedance state.

6. In a digital transmission system wherein a first subsystem transmits a message on a transmission line to a second subsystem during a message portion of a repetitive frame and the second subsystem transmits a response on said transmission line to the first subsystem during a response portion of the frame, a method for establishing synchronization between the responses and messages comprising the steps of:
   (a) when synchronization has been lost, discontinuing transmission of responses by the second subsystem and continuing transmission of messages by the first subsystem;
   (b) the second subsystem monitoring said transmission line until a predetermined sequence including a valid message followed by the absence of both message and response for a predetermined time is detected; and
   (c) resuming transmission of responses having prescribed time relationships with respect to said valid message.

7. A synchronization method as defined in claim 6 wherein a low power line driver and the low power line receiver are provided at each end of said transmission line and wherein the step of discontinuing transmission includes placing the low power line driver in the second subsystem in a high impedance state.

8. A synchronization method as defined in claim 6 wherein the step of monitoring the transmission line includes the steps of
- detecting a stop bit of a message,
- detecting a continuous string of bits equal to the stop bit of said message, said string of bits having a predetermined length, and
- detecting a start bit at the end of said string of bits, said string of bits of predetermined length followed by said start bit indicating the start of a message.

* * * * *